Figure 1:
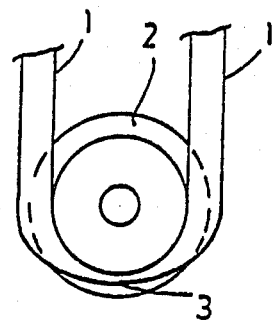

United States Patent [19]

Karpisek

[11] Patent Number: 4,681,214
[45] Date of Patent: Jul. 21, 1987

[54] TUBULAR CONVEYOR

[76] Inventor: Ladislav S. Karpisek, 86 Woodfield Boulevarde, Caringbah 2229, New South Wales, Australia

[21] Appl. No.: 810,330
[22] PCT Filed: Apr. 4, 1985
[86] PCT No.: PCT/AU85/00071
 § 371 Date: Dec. 6, 1985
 § 102(e) Date: Dec. 6, 1985
[87] PCT Pub. No.: WO85/04639
 PCT Pub. Date: Oct. 24, 1985

[30] Foreign Application Priority Data

Apr. 12, 1984 [AU] Australia .............................. PG4534
Apr. 4, 1985 [AU] Australia ............................ 40963/85

[51] Int. Cl.4 .............................................. B65G 15/08
[52] U.S. Cl. ..................................................... 198/819
[58] Field of Search ............................... 198/819, 607

[56] References Cited

U.S. PATENT DOCUMENTS 3,013,499 12/1961 Hubert ............................ 198/819 X
3,338,383 8/1967 Hashimoto ......................... 198/819
3,384,219 5/1968 Leach ............................. 198/819 X

FOREIGN PATENT DOCUMENTS

70669/81 8/1982 Australia .
75072/81 1/1984 Australia .
2001910 7/1971 Fed. Rep. of Germany ...... 198/819
2458266 6/1975 Fed. Rep. of Germany .
2800454 7/1979 Fed. Rep. of Germany ...... 198/819
140664 3/1980 Fed. Rep. of Germany ...... 198/819
57-81009 5/1982 Japan ................................. 198/819
185013 6/1936 Switzerland ........................ 198/819
887698 1/1962 United Kingdom ................ 198/819
1197700 7/1970 United Kingdom ................ 198/819
1400555 7/1975 United Kingdom ................ 198/819
2061853 5/1981 United Kingdom ................ 198/819

Primary Examiner—Joseph E. Valenza
Assistant Examiner—Jonathan D. Holmes
Attorney, Agent, or Firm—Anthony A. O'Brien

[57] ABSTRACT

A conveyor comprising a pulley (5,6) supported belt (1), which forms a tubular section when conveying materials. Material (4) is fed into the belt (1) by means (7) discharging below the level (CL) at which the belt is formed into a tube, but above the point which the line of the angle of repose of the material (4) being conveyed would be tangent to the inner face of the belt (1), ensuring that the tubular section is completely filled. The material (4) is conveyed to a discharge pipe (8) where the belt looses its tubular shape, causing the material to be discharged. A sleeve (9) may be provided to support the belt on vertical or inclined sections, and to ensure the tubular section is properly sealed.

5 Claims, 6 Drawing Figures

TUBULAR CONVEYOR

This invention relates to conveyors.

The conveyor proposed by this invention can be used for simple conveying and elevating through a range of angles up to and including vertical. It is a closed conveyor in its conveying zone and can be sealed closed in its conveying zone so as to make it waterproof and dustproof. Because it is closed in its conveying zone it can be used to convey materials without exposure to air from one non-oxidizing enviroment to another, which is important with the conveyance of oxidizing materials.

The conveyor could be used in many industries. It is envisaged that the conveyor could handle a range of products such as cement, flue dust, fly ash, gypsum, powdered metals, talcum powder, carbon black, sawdust, soap powders, wood shavings, pellets of rubber and plastics, wheat, rice, peanuts, beans, peas, barley and other discrete materials, starch, soils, clay, coal, sand, ores, and even high viscosity materials such as glues, pastes, honey, fruit concentrates, and inks for printing.

The conveyor as proposed by this invention is an endless belt on a pulley system, the belt is rendered tubular for at least that part extending between a feeding station and a discharge station. Such conveyors are not new, see for example Australian Pat. Nos. 70 669/81 and 75 072/81. The above patented conveyors and other like conveyors have a major disadvantage namely that they cannot convey vertically. It is in this area that the present invention provides an improvement in the art of conveying.

The improvement is achieved by feeding the material to be conveyed into the tubular portion between the feed station and the discharge station is such a way that the tubular portion runs completely full thereby permitting positive conveying at all angles up to and including vertical. The conveyor can also convey around corners thereby allowing a complex conveying system to be threaded through a factory installation.

The invention can be broadly said to comprise a conveyor comprising an endless belt supported on pulley means, means to form said belt as it moves over said pulley means into a closed tube which extends at least between a feed station and a discharge station, said tube comprising a filling section which lies adjacent said feed station and has a direction of movement when the conveyor is operative which is different to the direction of movement of the preceding section of said tube, said feed station includes a feed means which discharges into a feed end of the filling section of said tube at an elevation which is no higher than said feed end, which is above said preceding section and which is located above the position where a line at the angle of repose of material to be conveyed would be tangent to the inner face of the tube at the change of direction between said filling and preceding sections thereof.

Figure 2:
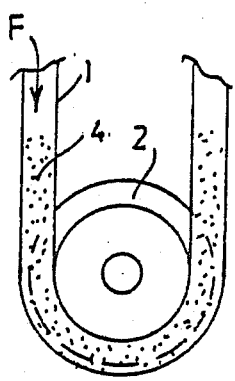
Figure 3:
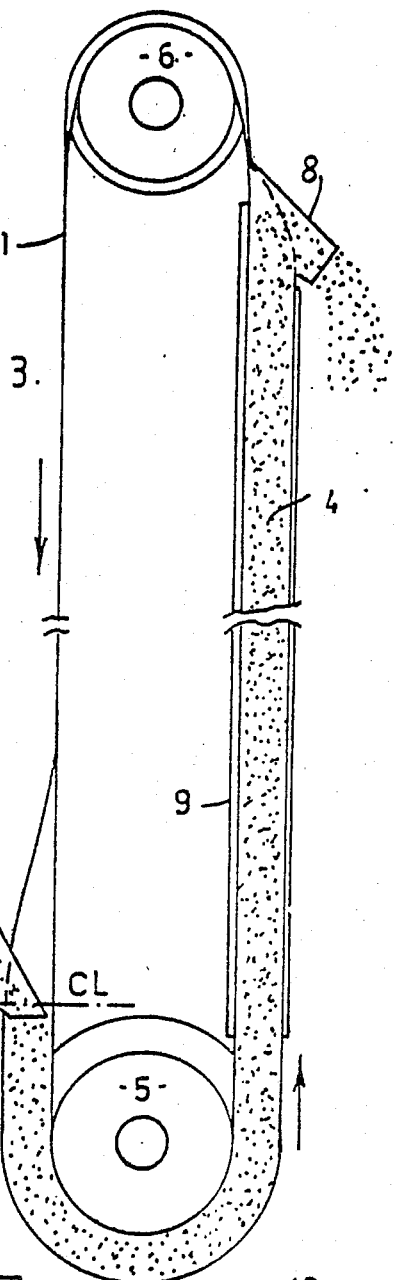
Figure 6:
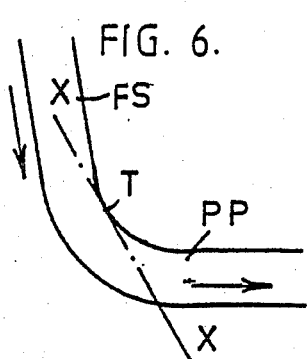
Figures 4, 5:
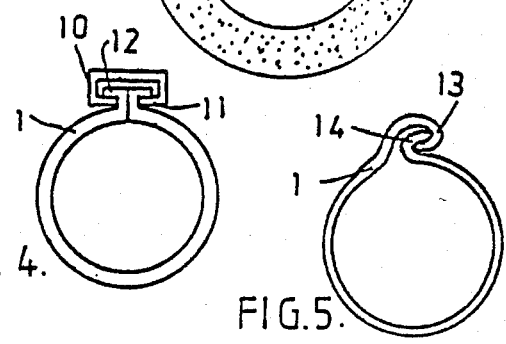

Preferred embodiments of the invention will now be described with reference to the accompanying drawings in which:

FIG. 1 is a side elevation showing an empty flexible tubular element pulled tightly around the bottom of a pulley, FIG. 2 is a sectional elevation showing the components of FIG. 1 when the tubular element is filled with material, FIG. 3 is a sectional side elevation of a typical conveyor according to the invention using a tubular element slit longitudinally, FIG. 4 is a sectional end view of a slit tubular element showing one form of a closure arrangement to maintain the edges of the element adjacent the slit together, FIG. 5 is a view similar to FIG. 4 showing an alternate closure arrangement and FIG. 6 is a schematic view to illustrates certain theoretical aspects of the invention.

By way of explanation of the basis of the invention, if a tube 1 as shown in FIG. 1 of flexible material was passed around a pulley 2, the tube 1 would flatten out where it passed around the pulley, as indicated by reference number 3.

If the tube 1 was filled with a flowable particulate material 4, such as wheat, prior to the tube passing in the direction of the arrow around the pulley 2, then the material 4 in the tube 1 would prevent it from flattening out, see FIG. 2. As the tube 1 advances in the direction of the arrow the material would be carried with the tube to a discharge position. The material can be conveyed vertically because the material is fed into the tube at a position and at a rate such that the tube is completely filled thereby providing support for the column of material 4 moving vertically up.

If, as shown in FIG. 3, the tube 1 as proposed was slit longitudinally and passed around two pulleys which applied a tension to the belt loop, where the lower pulley 5 had its periphery laterally concavely profiled to match the outer curvature of the tubular portion of the belt and the upper pulley 6 had its periphery laterally convexly contoured and a filling horn 7 was placed in the slit on the down-side of the tube travel, the conditions proposed by FIG. 2 could be achieved. If there was a discharge pipe 8 or the like located adjacent the upper pulley 6 on the up-side of the tube travel, then as the tube opened out to pass over the convex upper pulley 6 the material it had conveyed from the filling horn 7 would empty into the discharge pipe 8.

It is envisaged that the conveying member 1 could be of tubular form in its static state with a longitudinal slit therealong. As the belt passed over the pulley 6 it would be forced to open out before and after the pulley 6. The discharge tube 8 would act as a starter for the opening out process. Such a belt would be made from a flexible resilient material such as a rubber based material and would have a "memory" which would cause it to adopt a tubular form when forces where not present to cause it to adopt another form, for example the forces induced by the convex surface of the pulley 6. Alternatively the belt could have pre-formed curved elements made of, for example, spring steel embedded in the belt to cause it to naturally adopt a tubular form.

As the tube 1 passes around the lower pulley 5 there is a natural tendancy for the section of the tube to distort and the concave shape of the pulley 5 causes the distortion to be manifested as a force which brings the edges of the slit in the tube more tightly together. On the up-side of the tube travel the tube can be enclosed in a sleeve 9 to assist in maintaining the slit in the tube closed. Alternatively a series of interconnected rings or substantially encircling elements can be provided around the tube to support the tubular form of the belt and assist in maintaining the slit in the tube closed. The sides of the slit in the tube can be positively locked together. For example there is shown in FIG. 4 a channel member 10 with inturned lips 11 to engage under longitudinal flanges or a series of lugs 12 along the sides of the slit in the tubular member. In FIG. 5 there is another arrangement wherein a hooked edge 13 along one side of the slit in the tubular member is engaged under a like hooked edge 14 along the other edge of the slit in the tubular member. The hooked edges 13 and 14 can be continuous or of lug form.

Referring now to FIG. 6. The line X—X represents the angle of repose of the material 4 and the point indicated T is where the line X—X is tangent to the inner surface of the tube where the direction of movement of the filling section FS of the tube deviates from the direction of movement of the preceding portion of the tube PP on its way to a discharge station 8. PP can be at an angle to the FS and may be on a curve, as shown in FIG. 2 prior to the elevation of the material or may be a horizontal section prior to elevation at an angle up to vertical.

The material will be carried with the tube to the discharge station 8 only because the tube is completely filled. In order to completely fill the tube FS prior to conveyance of the material to the discharge station 8, it is obviously necessary to fill the tube FS at a rate at least equal to the rate at which the material will be conveyed by the tube. It is also necessary, because of the angle of repose of the material being conveyed, to have the filling position for the material located at the elevation T or above if the tube is to be maintained filled and free of voids. From a practical point of view it is also desirable that the bottom of the horn 7 should be within the tube, that is below the position indicated CL or closure level where the tube is first formed, so that spillage of material will not occur.

As will be understood, the physical example of the conveyor shown in FIG. 3 is only representative and more complex conveying systems can be provided. In all cases however the conditions set forth in the accompanying claims must be adhered to if positive conveying due to complete filling of the conveying tube is to be obtained.

I claim:

1. A conveyor comprising two pulleys spaced apart vertically with an endless belt extending around the pulleys and therebetween to provide a down run of belt and an up run of belt, the belt being made of a resilient material and having a tubular form and longitudinal slit, the peripheral surface of the lower pulley having a laterally extending concave profile with a radius of curvature which is substantially the same as the radius of curvature of the exterior of the belt, the peripheral surface of the upper pulley having a laterally extending convex profile, a feed means to feed material into the down run of belt adjacent the lower pulley and a discharge station to discharge material from the up run of belt adjacent the upper pulley, the belt being in the tubular form from the feed means around the lower pulley to the discharge station, a retaining means embracing the up run of the belt from adjacent the lower pulley to the discharge station for maintaining the belt closed with the edges of the slit in abutting contact, the belt being opened laterally outward by the convex profile of the upper pulley as the belt leaves the retaining means to allow material to gravitationally discharge from the belt at the discharge station, the belt remaining open around the upper pulley and along the down run of belt to adjacent the feed means where the belt is returned to the tubular form by the convave profile of the lower pulley, the feed means being located at an elevation above the point where a line at the angle of repose of the material to be conveyed is tangent to the inner surface of the belt as is passes onto the lower pulley.

2. A conveyor as claimed in claim 1, wherein the retaining means is a tubular member with an internal shape and size substantially the same as the external tubular form of the belt.

3. A conveyor as claimed in claim 1, wherein the feed means is a chute which extends into the interior of the belt and inhibits the reversion of the opened belt to the tubular form until after the belt passes the chute.

4. A conveyor as claimed in claim 1 wherein the belt has longitudinal hooked edge flanges which are engagable with one another and which when engaged retain the belt in the tubular form.

5. A conveyor as claimed in claim 1 wherein the belt has longitudinal edge flanges which, when the belt is in the tubular form, project in opposite directions and the flanges are engaged under inturned flanges of a retaining member for at least part of the distance between said feed station and said discharge station.

* * * * *